(12) United States Patent
Watanabe et al.

(10) Patent No.: US 9,746,840 B2
(45) Date of Patent: Aug. 29, 2017

(54) SMART ENTRY SYSTEM

(71) Applicant: HONDA MOTOR CO., LTD., Tokyo (JP)

(72) Inventors: Tomonori Watanabe, Utsunomiya (JP); Katsuyasu Yamane, Shioya-gun (JP); Kentaro Yoshimura, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/583,306

(22) Filed: Dec. 26, 2014

(65) Prior Publication Data

US 2016/0189460 A1 Jun. 30, 2016

(51) Int. Cl.
| | |
|---|---|
| G05B 15/02 | (2006.01) |
| E05B 81/76 | (2014.01) |
| G07C 9/00 | (2006.01) |
| E05B 81/78 | (2014.01) |

(52) U.S. Cl.
CPC ............ *G05B 15/02* (2013.01); *E05B 81/76* (2013.01); *E05B 81/78* (2013.01); *G07C 9/00182* (2013.01); *G07C 9/00563* (2013.01); *G07C 2009/00269* (2013.01); *G07C 2009/00277* (2013.01); *G07C 2209/08* (2013.01); *G07C 2209/65* (2013.01)

(58) Field of Classification Search
None
See application file for complete search history.

(56) References Cited

U.S. PATENT DOCUMENTS

| | | | | |
|---|---|---|---|---|
| 2004/0070489 | A1* | 4/2004 | Ueda ..................... | E05B 85/01 340/5.61 |
| 2005/0219036 | A1* | 10/2005 | Ueda .................. | B60R 25/2036 340/5.62 |
| 2015/0070136 | A1* | 3/2015 | Kameyama ............ | B60R 25/20 340/5.72 |

(Continued)

FOREIGN PATENT DOCUMENTS

| | | |
|---|---|---|
| DE | 100 36 946 | 2/2002 |
| DE | 102 40 828 | 3/2004 |

(Continued)

OTHER PUBLICATIONS

Japanese Office Action dated Oct. 18, 2016, Application No. 2015-206574, English translation included.

(Continued)

*Primary Examiner* — Daniell L Negron
(74) *Attorney, Agent, or Firm* — Rankin, Hill & Clark LLP

(57) ABSTRACT

A smart entry system includes an unlocking sensor, a locking sensor, a smart control unit, and a central control unit. The unlocking sensor detects an operator's intention of unlocking a door. The locking sensor detects the operator's intention of locking the door. The smart control unit confirms whether the operator is an authorized user. The central control unit opens or closes a door lock when the unlocking sensor or the locking sensor is operated and the operator is a regular operator. The central control unit opens the door lock when the unlocking sensor and the locking sensor are operated substantially at the same time while the door lock is in a closed state.

6 Claims, 4 Drawing Sheets

(56) References Cited

U.S. PATENT DOCUMENTS

2015/0325066 A1   11/2015   Muller

FOREIGN PATENT DOCUMENTS

| DE | 10 2012 108 004 | 3/2014 |
| DE | 102 62 353 | 2/2015 |
| JP | 2005-299098 | 10/2005 |
| JP | 2010-090629 | 4/2010 |
| JP | 5170858 B | 3/2013 |
| JP | 5279562 B | 9/2013 |

OTHER PUBLICATIONS

German Office Action dated Oct. 2, 2016, Application No. 10 2015 223 494.0, English translation included.

* cited by examiner

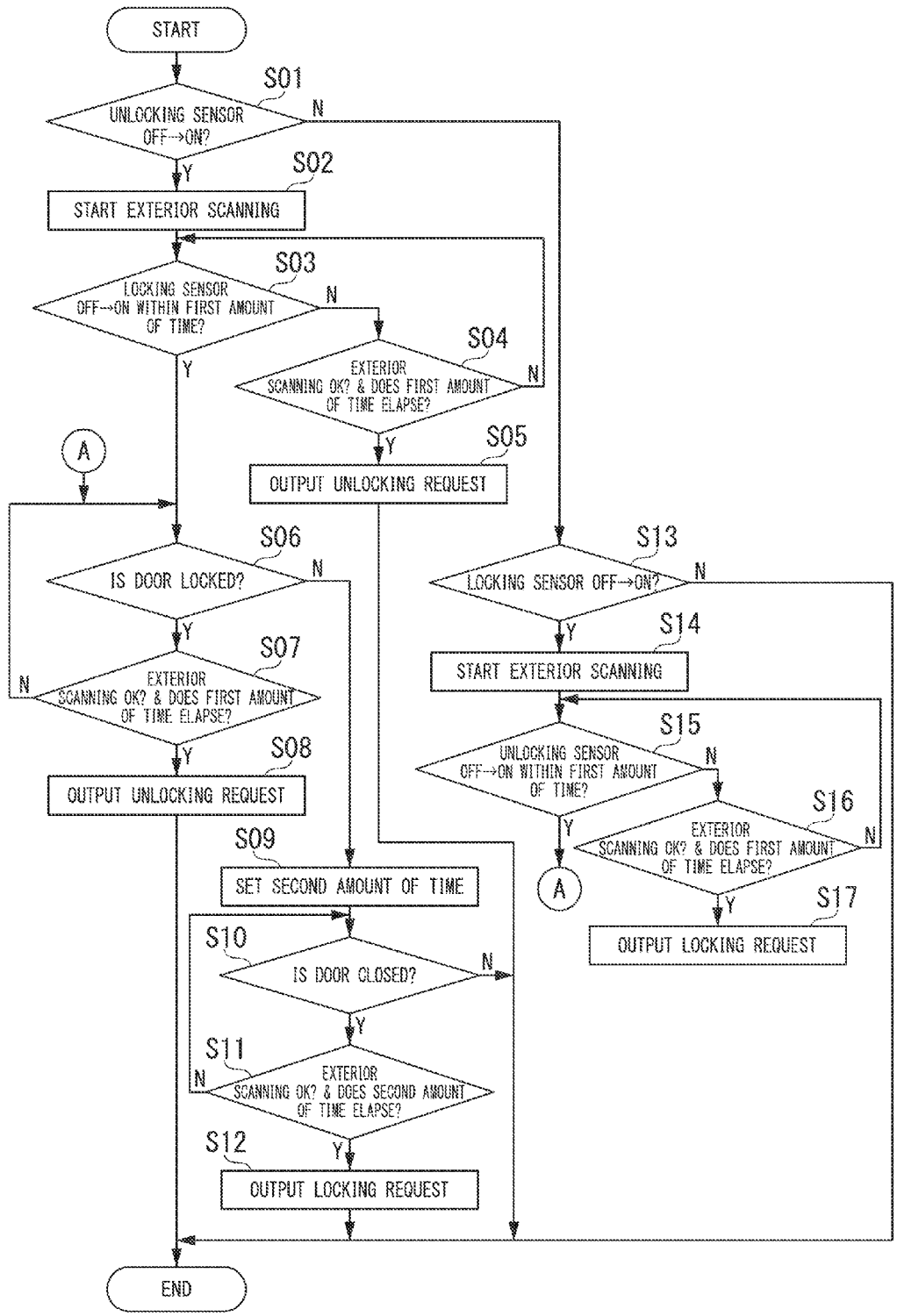

SMART ENTRY SYSTEM

BACKGROUND OF THE INVENTION

Field of the Invention

The present invention relates to a smart entry system.

Description of Related Art

In the related art, a smart entry system is known which includes a locking sensor and an unlocking sensor disposed in an outer handle of a vehicle door (for example, see Japanese Patent No. 5170858). The locking sensor senses an operator's intention of locking a door. The unlocking sensor senses the operator's intention of unlocking the door. In this smart entry system, when detection of the intention of locking the door by the locking sensor and detection of the intention of unlocking the door by the unlocking sensor are performed at the same time while a door of a vehicle is in a locked state or the like, priority is given to maintaining a locked state or transitioning to the locked state.

In the related art, a door lock controller is known which forbids the unlocking of a door during a forbiddance time after the door of a vehicle is locked (for example, see Japanese Patent No. 5279562). The door lock controller releases the forbiddance time by starting transmission of a request signal when an approaching hand is sensed by a locking electrode and an unlocking electrode during the forbiddance time.

SUMMARY OF THE INVENTION

In the smart entry system according to the related art, when detection of the intention of locking the door by the locking sensor and detection of the intention of unlocking the door by the unlocking sensor are performed at the same time, it is estimated that there is a high possibility that an operator has performed a certain intentional operation. However, since the smart entry system gives priority to the maintaining the locked state or the transition to the locked state, the operator's intention may not be realized.

In the door lock controller according to the related art, the locking of the door may be inhibited during the forbiddance time after the door of the vehicle is unlocked. However, the door lock controller waits for an operator's operation during the forbiddance time or requires a particular operation for releasing the forbiddance time, when an operation against the operator's intention is sensed slightly earlier than the operator's intentional operation. Accordingly, there is a problem in that use of the door lock controller is inconvenient.

The invention is made in consideration of the aforementioned circumstances and an object thereof is to provide a smart entry system which can appropriately reflect an operator's intention while a door of a vehicle is in a locked state or unlocked state.

The invention employs the following aspects in order to solve the aforementioned problem and to achieve the aforementioned object.

(1) According to an aspect of the invention, a smart entry system includes: an unlocking sensor that is disposed in the vicinity of a door handle of a door of a vehicle and that detects a user's intention of unlocking the door; a locking sensor that is disposed in the vicinity of the unlocking sensor and that detects the user's intention of locking the door; an authentication unit that confirms whether the user is an authorized user; and a control unit that detects that the unlocking sensor or the locking sensor are operated and that opens or closes a door lock of the door when it is confirmed by the authentication unit that the user is an authorized user, wherein the control unit opens the door lock when the operation of the unlocking sensor and the operation of the locking sensor are detected substantially at the same time while the door lock is in a closed state.

(2) According to another aspect of the invention, there is provided a smart entry system including: an unlocking sensor that is disposed in the vicinity of a door handle of a door of a vehicle and that detects a user's intention of unlocking the door; a locking sensor that is disposed in the vicinity of the unlocking sensor and that detects the user's intention of locking the door; an authentication unit that confirms whether the user is an authorized user; and a control unit that detects that the unlocking sensor or the locking sensor are operated and that opens or closes a door lock of the door when it is confirmed by the authentication unit that the user is an authorized user, wherein the control unit waits for a predetermined amount of time when the operation of the unlocking sensor and the operation of the locking sensor are detected substantially at the same time while the door lock is in an opened state, and does not perform either a locking operation or an unlocking operation at least until the door is closed when the door is opened within the predetermined amount of time.

(3) In the smart entry system according to (2), the control unit may close the door lock when the door has not been opened within the predetermined amount of time.

(4) In the smart entry system according to any one of (1) to (3), the unlocking sensor and the locking sensor may be capacitive sensors that detect a touching of a surface of the door handle by the user, the unlocking sensor may be disposed at a position where a touching of a surface of the door handle facing the door is able to be detected, and the locking sensor may be disposed at a position which is located on an upper side in the vehicle vertical direction of the door handle and where a touching within a movable range of a thumb of the grasping hand can be detected when the user grasps the door handle.

(5) In the smart entry system according to any one of (1) to (4), the authentication unit may transmit an interrogation signal from the vehicle when the unlocking sensor or the locking sensor is operated, may confirm that the user is an authorized user based on reception of a response signal returned from a portable device carried by the user in response to reception of the interrogation signal, and when the operation of the unlocking sensor and the operation of the locking sensor are detected substantially at the same time by the control unit, the authentication unit may confirm that the user is an authorized user based on only the confirmation as a response to the interrogation signal transmitted in response to a first-detected operation.

In the smart entry system according to the aspect of (1), when the operation of the unlocking sensor and the operation of the locking sensor are detected at the same time while the vehicle door is in a locked (the door lock is closed), it is estimated that there is a high possibility that the user grasps the door handle with an intention of unlocking the door or with an intention of opening the door. Accordingly, the control unit can prevent the door-locked state from being maintained against the user's intention by unlocking the door (by opening the door lock).

In the smart entry system according to the aspect of (2), when the operation of the unlocking sensor and the operation of the locking sensor are detected at the same time while the vehicle is in an unlocked state, it is estimated that there is a high possibility that the user has merely grasped the door handle with the intention of opening the door. Accordingly, the control unit can prevent the door from being locked against the user's intention of opening the door by releasing the locking (closing the door lock) when the door is opened within a predetermined amount of time.

According to the configuration of (3), when the door is not opened within a predetermined amount of time after the operation of the unlocking sensor and the operation of the locking sensor are detected at the same time while the vehicle is in an unlocked state, it is estimated that there is a high possibility that the user has an intention of locking of the door. Accordingly, the control unit can ensure security by locking the door even when the locking operation is not performed again.

According to the configuration of (4), since the locking sensor is disposed on the upper side not on the front side of the door handle, the thumb rarely erroneously touches the locking sensor when the user grasps the door handle and the locking sensor is easily operated when the user intentionally touches the locking sensor.

According to the configuration of (5), since the authentication can be prevented from being performed twice, it is possible to prevent waste of electric power of the vehicle and the portable device and to shorten the time required for authentication.

BRIEF DESCRIPTION OF THE DRAWINGS

FIG. 5 is a flowchart illustrating an operation flow of the smart entry system according to the embodiment of the invention.

DETAILED DESCRIPTION OF THE INVENTION

Hereinafter, a smart entry system according to an embodiment of the invention will be described with reference to the accompanying drawings.

Figure 1:
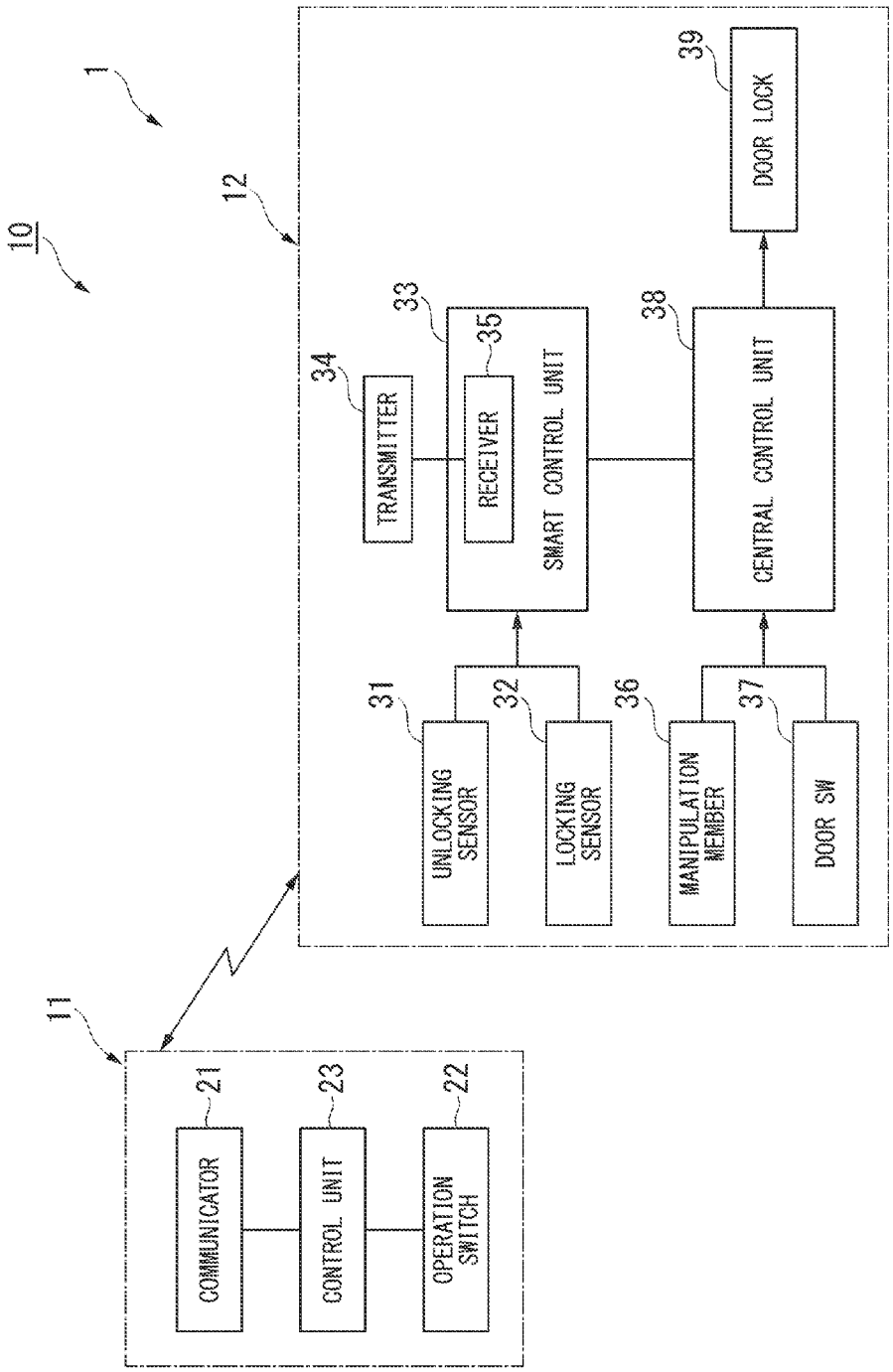
FIG. 1 is a block diagram illustrating a configuration of a smart entry system according to an embodiment of the invention.

The smart entry system 10 according to the embodiment includes a portable device 11 serving as an electronic key of a vehicle 1 and an onboard system 12 mounted on the vehicle 1, as illustrated in FIG. 1.

The portable device 11 is a communication terminal carried by a driver of the vehicle 1. The portable device 11 performs wireless communication with the onboard system 12. The portable device 11 transmits a response signal for responding to a request signal transmitted from the onboard system 12 and a command signal for instructing activation of a predetermined onboard device along with specific identification information. The portable device 11 instructs starting or stopping of a drive source (such as an internal combustion engine or a motor) of the vehicle 1 and locking or unlocking of a door 2 through driving of a door lock 39 of the vehicle 1 to be described later.

The portable device 11 includes a communicator 21, an operation switch 22, and a control unit 23.

The communicator 21 performs wireless communication with a transmitter 34 and a receiver 35 of the onboard system 12 to be described later. The communicator 21 receives a low frequency (LF) signal which is periodically transmitted from the transmitter 34 of the onboard system 12 through the use of an LF antenna (not illustrated). The communicator 21 transmits a radio frequency (RF) signal to the receiver 35 of the onboard system 12 through the use of an RF antenna (not illustrated).

The operation switch 22 receives an operator's input operation and outputs a signal (for example, a command signal for instructing activation of a predetermined onboard device) corresponding to the input operation.

The control unit 23 comprehensively controls the operation of the portable device 11.

When the communicator 21 receives a request signal in response to the LF signal intermittently transmitted from the onboard system 12, the control unit 23 determines whether the request signal is a regular request signal. When it is determined that the received request signal is a regular request signal, the control unit 23 instructs the communicator 21 to transmit a response signal in response to the RF signal having specific identification information as a response to the request signal to the onboard system 12. When a command signal for instructing activation of a predetermined onboard device is output from the operation switch 22, the control unit 23 instructs the communicator 21 to transmit the command signal to the onboard system 12.

The onboard system 12 includes at least one unlocking sensor 31, at least one locking sensor 32, a smart control unit 33, a transmitter 34, a receiver 35, a manipulation member 36, a door switch 37, a central control unit 38, and at least one door lock 39.

Figure 2:
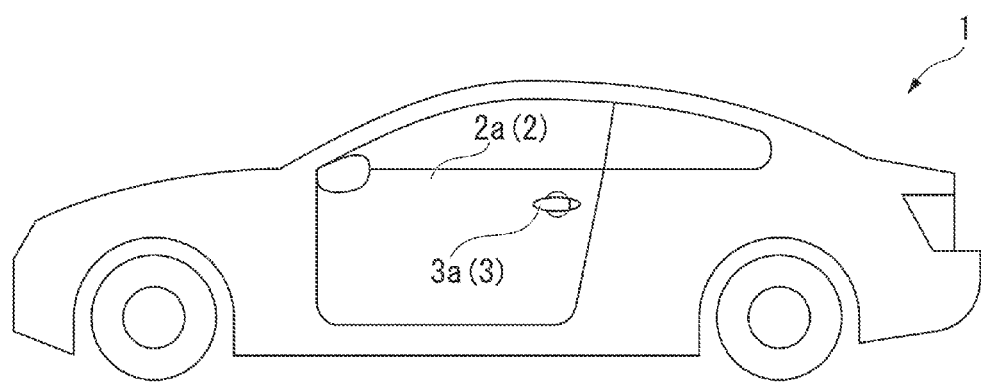
FIG. 2 is a diagram schematically illustrating a vehicle on which the smart entry system according to the embodiment of the invention is mounted when viewed from the outside in the vehicle transverse direction.

At least one unlocking sensor 31 and at least one locking sensor 32 are disposed in the vicinity of a door handle 3 (for example, a door handle 3a of a driver seat illustrated in FIG. 2) of at least one door 2 (for example, a door 2a of the driver seat illustrated in FIG. 2) of the vehicle 1.

Figure 3:
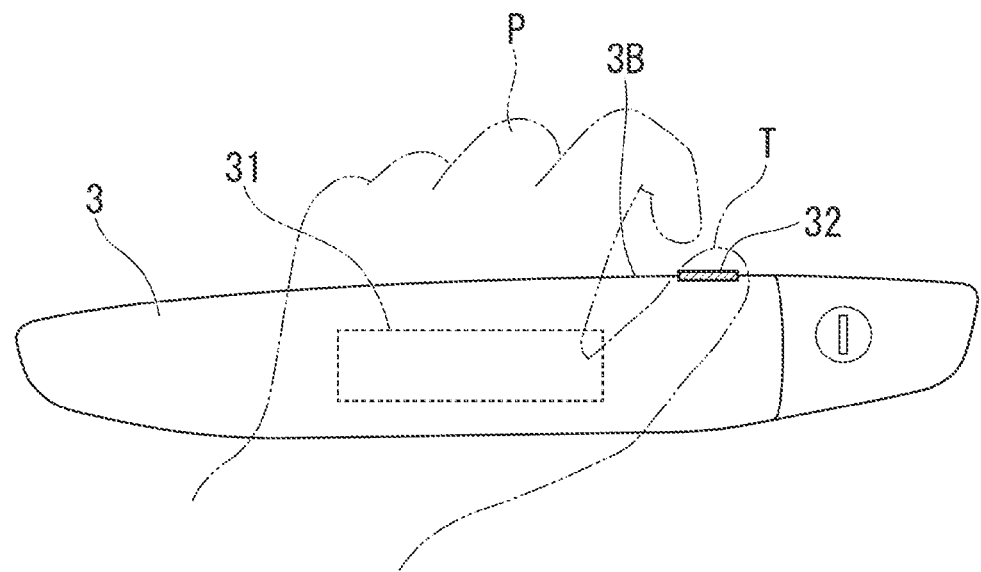
FIG. 3 is a diagram schematically illustrating a door handle of the smart entry system according to the embodiment of the invention when viewed from the outside in the vehicle transverse direction.
Figure 4:
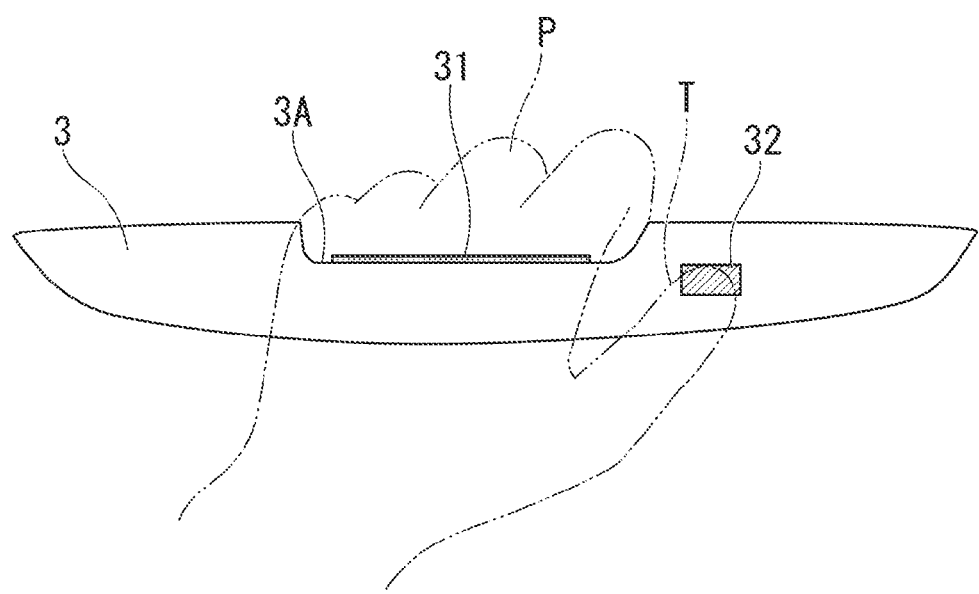
FIG. 4 is a diagram schematically illustrating the door handle of the smart entry system according to the embodiment of the invention when viewed from the upper side in the vehicle vertical direction.

The unlocking sensor 31 is disposed on a surface 3A of the door handle 3 facing the door 2, as illustrated in FIGS. 3 and 4. The unlocking sensor 31 is, for example, a capacitive sensor and detects an operator's touching of the surface 3A with a finger P. The unlocking sensor 31 outputs a signal to unlock the door 2 in response to the operator's touching operation. Accordingly, the unlocking sensor 31 detects the operator's intention of unlocking the door 2.

The locking sensor 32 is disposed on a surface 3B of the door handle 3 on the upper side in the vehicle vertical direction. The locking sensor 32 is disposed within the movable range of the thumb T of the hand when the operator grasps the door handle 3 with the finger P. The locking sensor 32 is, for example, a capacitive sensor and detects the operator's touching of the surface 3B with the finger P. The locking sensor 32 outputs a signal to lock the door 2 in response to the operator's touching operation. Accordingly, the locking sensor 32 detects the operator's intention of locking the door 2.

The smart control unit 33 is connected to the central control unit 38 and the like so as to communicate with each other via a CAN communication line which is a general communication line. The smart control unit 33 controls wireless communication between the portable device 11 and the transmitter 34 of the receiver 35. The transmitter 34 includes an LF antenna disposed in the door handle 3. The receiver 35 includes an RF antenna built into the smart control unit 33. The smart control unit 33 periodically transmits a request signal based on an LF signal within a predetermined communication range from the transmitter 34. When a response signal based on an RF signal from the portable device 11 in response to the request signal is received by the receiver 35, the smart control unit 33 compares identification information included the response signal with identification information stored in advance therein. When the received identification information corresponds to the stored identification information, the smart control unit 33 detects that communication between the portable device 11 and the transmitter 34 or the receiver 35 is set up and confirms that the operator carrying the portable device 11 is a regular operator. When a command signal, which is output from the portable device 11, instructing activation of a predetermined onboard device is received by the receiver 35 after it is confirmed that the operator of the portable device 11 is a regular operator, the smart control unit 33 transmits the command signal to the central control unit 38.

When a signal (signal for a request to unlock the door 2) output from the unlocking sensor 31 or a signal (signal for a request to lock the door 2) output from the locking sensor 32 is received, the smart control unit 33 transmits the received signal to the central control unit 38.

When the signal output from the unlocking sensor 31 and the signal output from the locking sensor 32 are received within a predetermined amount of time (for example, 300 ms), the smart control unit 33 determines that the operation of the unlocking sensor 31 and the operation of the locking sensor 32 are detected substantially at the same time.

The manipulation member 36 outputs a signal indicating position information (that is, information related to the unlocking and locking of the door 2) of an operation member (not illustrated) for mechanically driving the door lock 39 through the operator's operation in the door 2.

The door switch (door SW) 37 outputs a signal indicating information related to the opening and closing of the door 2.

The central control unit 38 includes a processor such as a CPU, a ROM storing a program, and a RAM temporarily storing data. The central control unit 38 constitutes a so-called body control module (BCM) along with the smart control unit 33. The central control unit 38 comprehensively controls the operations of various onboard devices. The central control unit 38 controls the operation of the door lock 39 based on the signals output from the smart control unit 33 and the controls output from the manipulation member 36 and the door switch 37.

When receiving the signals output from the manipulation member 36 and the door switch 37, the central control unit 38 transmits the signals to the smart control unit 33 if necessary.

When the smart control unit 33 receives a signal requesting unlocking of the door 2, which is output from the unlocking sensor 31, and a signal requesting locking of the door 2, which is output from the locking sensor 32, and confirms that the operator of the portable device 11 is a regular operator, the central control unit 38 opens or closes the door lock 39.

The central control unit 38 opens the door lock 39 when the operation of the unlocking sensor 31 and the operation of the locking sensor 32 are detected substantially at the same time by the smart control unit 33 while the door lock 39 is in a closed state.

The central control unit 38 waits for a predetermined amount of waiting time (for example, 1 second) when the operation of the unlocking sensor 31 and the operation of the locking sensor 32 are detected substantially at the same time by the smart control unit 33 while the door lock 39 is in an opened state. When the door 2 is opened within the predetermined amount of waiting time, the central control unit 38 does not perform either the locking operation or the unlocking operation at least until the door 2 is closed. When the door 2 is not opened within the predetermined amount of waiting time, the central control unit 38 closes the door lock 39.

The door lock 39 includes a door lock mechanism (not illustrated) unlocking and locking the door 2 and a door lock motor (not illustrated) driving the door lock mechanism.

The smart entry system 10 according to this embodiment has the aforementioned configuration and an example of the operation of the smart entry system 10 will be described below with reference to the flowchart illustrated in FIG. 5.

First, the smart control unit 33 determines whether an ON signal (that is, signal requesting unlocking of the door 2) is output from the unlocking sensor 31 through the operator's operation of the unlocking sensor 31 (step S01).

When the determination result is "NO", the smart control unit 33 causes the operation flow to move to step S13 to be described later (NO in step S01).

On the other hand, when the determination result is "YES", the smart control unit 33 causes the operation flow to move to step S02 (YES in step S01).

Then, the smart control unit 33 starts scanning the exterior (step S02). In the exterior scanning, the smart control unit 33 periodically transmits a request signal from the transmitter 34 in a predetermined communication range and monitors the receiver 35 to determine if it receives a response signal from the portable device 11 in response to the request signal.

Then, the smart control unit 33 determines whether an ON signal (that is, signal requesting locking of the door 2) is output from the locking sensor 32 within a first amount of time (for example, 300 ms) after the ON signal is output from the unlocking sensor 31 (step S03).

When the determination result is "NO", the smart control unit 33 causes the operation flow to move to step S04 (NO in step S03).

On the other hand, when the determination result is "YES", the smart control unit 33 causes the operation flow to move to step S06 to be described later (YES in step S03).

The smart control unit 33 normally ends the exterior scanning upon reception of the response signal from the portable device 11 in response to the request signal by the receiver 35 and determines whether the first amount of time (for example, 300 ms) has elapsed after the ON signal is output from the unlocking sensor 31 (step S04).

When the determination result is "NO", the smart control unit 33 returns the operation flow to step S03 (NO in step S04).

On the other hand, when the determination result is "YES", the smart control unit 33 causes the operation flow to move to step S05 (YES in step S04).

Then, the smart control unit 33 outputs an unlocking request signal requesting opening of the door lock 39 to the central control unit 38 (step S05). The smart control unit 33 ends the operation flow.

Then, the smart control unit 33 determines whether the door lock 39 is in a closed state (step S06).

When the determination result is "NO", the smart control unit 33 causes the operation flow to move to step S09 to be described later (NO in step S06).

On the other hand, when the determination result is "YES", the smart control unit 33 causes the operation flow to move to step S07 (YES in step S06).

The smart control unit 33 normally ends the exterior scanning upon reception of the response signal from the portable device 11 in response to the request signal by the receiver 35 and determines whether the first amount of time (for example, 300 ms) has elapsed after the ON signal is output from the unlocking sensor 31 (step S07).

When the determination result is "NO", the smart control unit 33 returns the operation flow to step S06 (NO in step S07).

On the other hand, when the determination result is "YES", the smart control unit 33 causes the operation flow to move to step S08 (YES in step S07).

Then, the smart control unit 33 outputs an unlocking request signal requesting opening of the door lock 39 to the central control unit 38 (step S08). The smart control unit 33 ends the operation flow.

The timer value of a countdown timer is set to a second amount of time (for example, 1 second) (step S09).

Then, the smart control unit 33 determines whether the door 2 is closed (step S10).

When the determination result is "NO", the smart control unit 33 ends the operation flow (NO in step S10).

On the other hand, when the determination result is "YES", the smart control unit 33 causes the operation flow to move to step S11 (YES in step S10).

The smart control unit 33 normally ends the exterior scanning upon reception of the response signal from the portable device 11 in response to the request signal by the receiver 35 and determines whether the second amount of time has elapsed after the timer value of the countdown timer is set (step S11).

When the determination result is "NO", the smart control unit 33 returns the operation flow to step S10 (NO in step S11).

On the other hand, when the determination result is "YES", the smart control unit 33 causes the operation flow to move to step S12 (YES in step S11).

Then, the smart control unit 33 outputs a locking request signal requesting closing of the door lock 39 to the central control unit 38 (step S12). The smart control unit 33 ends the operation flow.

First, the smart control unit 33 determines whether an ON signal (that is, signal requesting locking of the door 2) is output from the locking sensor 32 through the operator's operation of the locking sensor 32 (step S13).

When the determination result is "NO", the smart control unit 33 ends the operation flow (NO in step S13).

On the other hand, when the determination result is "YES", the smart control unit 33 causes the operation flow to move to step S14 (YES in step S13).

Then, the smart control unit 33 starts the exterior scanning (step S14). In the exterior scanning, the smart control unit 33 periodically transmits a request signal from the transmitter 34 in a predetermined communication range and monitors the receiver 35 to determine if it receives a response signal from the portable device 11 in response to the request signal.

Then, the smart control unit 33 determines whether an ON signal (that is, signal requesting unlocking of the door 2) is output from the unlocking sensor 31 within the first amount of time (for example, 300 ms) after the ON signal is output from the locking sensor 32 (step S15).

When the determination result is "NO", the smart control unit 33 causes the operation flow to move to step S16 (NO in step S15).

On the other hand, when the determination result is "YES", the smart control unit 33 causes the operation flow to move to step S06 described above (YES in step S15).

The smart control unit 33 normally ends the exterior scanning upon reception of the response signal from the portable device 11 in response to the request signal by the receiver 35 and determines whether the first amount of time (for example, 300 ms) has elapsed after the ON signal is output from the locking sensor 32 (step S16).

When the determination result is "NO", the smart control unit 33 returns the operation flow to step S15 (NO in step S16).

On the other hand, when the determination result is "YES", the smart control unit 33 causes the operation flow to move to step S17 (YES in step S16).

Then, the smart control unit 33 outputs a locking request signal requesting closing of the door lock 39 to the central control unit 38 (step S17). The smart control unit 33 ends the operation flow.

As described above, in the smart entry system 10 according to this embodiment, the central control unit 38 opens the door lock 39 when the unlocking sensor 31 and the locking sensor 32 are operated substantially at the same time while the door lock 39 is in a closed state. Since the central control unit 38 estimates that there is a high possibility that the operator has grasped the door handle 3 with an intention of unlocking the door 2 or with an intention of opening the door 2 and opens the door lock 39, it is possible to prevent the door-locked state from being maintained against the operator's intention.

The central control unit 38 waits for a predetermined amount of waiting time when the unlocking sensor 31 and the locking sensor 32 are operated substantially at the same time while the door lock 39 is in an opened state. Since the central control unit 38 estimates that there is a high possibility that the operator has merely grasped the door handle 3 with the intention of opening the door 2 and waits for the predetermined amount of waiting time, it is possible to prevent the door 2 from being locked against the operator's intention of opening the door 2. The central control unit 38 can prevent the door 2 from being locked against the operator's intention by releasing the locking of the door lock 39 when the door 2 is opened within the predetermined amount of waiting time. When the door 2 is not opened within the predetermined amount of waiting time, the central control unit 38 estimates that there is a high possibility that the operator has the intention of locking the door and closes the door lock 39. Accordingly, it is possible to ensure security by locking the door 2 even when the locking sensor 32 is not operated again.

Since the locking sensor 32 is disposed on the surface 3B of the door handle 3 on the upper side in the vehicle vertical direction, it is possible to further prevent a thumb's erroneous touching of the locking sensor when the operator grasps the door handle 3, for example, in comparison with a case in which the locking sensor is disposed on the front surface of the door handle 3. When the operator intentionally touches the locking sensor 32, it is possible to prevent the operation from failing.

Modification examples of the aforementioned embodiment will be described below.

In the aforementioned embodiment, the smart control unit 33 confirms that the operator carrying the portable device 11 is a regular operator when a response signal from the portable device 11 in response to the request signal periodically transmitted from the transmitter 34 is received by the receiver 35, but the invention is not limited to this configuration.

The smart control unit 33 may transmit an interrogation signal from the transmitter 34 when the unlocking sensor 31 or the locking sensor 32 is operated, and may confirm that the operator carrying the portable device 11 is a regular operator when a response signal returned from the portable device 11 having received the interrogation signal is received by the receiver 35. The smart control unit 33 may confirm that the operator is a regular operator based on only the confirmation as a response to the interrogation signal transmitted from the transmitter 34 in response to the first-detected operation when the operation of the unlocking sensor 31 and the operation of the locking sensor 32 are detected substantially at the same time.

According to this modification example, since double authentication for the operation of the unlocking sensor 31 and the operation of the locking sensor 32 can be prevented, it is possible to prevent the waste of electric power in the vehicle 1 and the portable device 11 and to shorten the time required for authentication.

In the aforementioned embodiment, the unlocking sensor 31 and the locking sensor 32 are disposed on the surface 3A and the surface 3B of the door handle 3, respectively, but the invention is not limited to this configuration.

The unlocking sensor 31 and the locking sensor 32 may be disposed within the movable range of the finger grasping the door handle 3 on the surface of the door handle 3 and in the vicinity of the door handle 3.

The embodiment of the invention has been provided as an example, and has not been provided to limit the scope of the invention. The embodiment may be embodied in various other forms and can be subjected to a variety of omissions, replacements, and changes without departing from the gist of the invention. The embodiment and the modifications thereof belong to the scope or gist of the invention and also belong to the scope of the invention equivalent to the appended claims.

What is claimed is:

1. A smart entry system comprising:
   an unlocking sensor that is disposed in a vicinity of a door handle of a door of a vehicle and that detects a user's intention of unlocking the door;
   a locking sensor that is disposed in the vicinity of the unlocking sensor and that detects the user's intention of locking the door;
   an authentication unit that confirms whether the user is an authorized user; and
   a control unit that detects that the unlocking sensor or the locking sensor are operated and that opens or closes a door lock of the door when it is confirmed by the authentication unit that the user is an authorized user,
   wherein the control unit waits for a second predetermined amount of time when an operation of the unlocking sensor and an operation of the locking sensor are detected within a predetermined amount of time while the door lock is in an opened state and the door is closed, and when the door is opened within the second predetermined amount of time, the control unit does not perform either a locking operation due to the operation of the locking sensor or an unlocking operation due to the operation of the unlocking sensor at least until the door is closed again.

2. The smart entry system according to claim 1, wherein the control unit closes the door lock when the door has not been opened within the second predetermined amount of time.

3. The smart entry system according to claim 1,
   wherein the unlocking sensor and the locking sensor are capacitive sensors that detect a touching of a surface of the door handle by the user,
   wherein the unlocking sensor is disposed at a position where a touching of a surface of the door handle facing the door is able to be detected, and
   wherein the locking sensor is disposed at a position which is located on an upper side in the vehicle vertical direction of the door handle and where a touching within a movable range of a thumb of the grasping hand can be detected when the user grasps the door handle.

4. A smart entry system comprising:
   an unlocking sensor that is disposed in a vicinity of a door handle of a door of a vehicle and that detects a user's intention of unlocking the door;
   a locking sensor that is disposed in the vicinity of the unlocking sensor and that detects the user's intention of locking the door;
   an authentication unit that confirms whether the user is an authorized user; and
   a control unit that detects that the unlocking sensor or the locking sensor are operated and that opens or closes a door lock of the door when it is confirmed by the authentication unit that the user is an authorized user,
   wherein the control unit waits for a second predetermined amount of time when an operation of the unlocking sensor and an operation of the locking sensor are detected within a predetermined amount of time while the door lock is in an opened state and the door is closed, and when the door is opened within the second predetermined amount of time, the control unit does not perform a locking operation due to the operation of the locking sensor at least until the door is closed again.

5. The smart entry system according to claim 4, wherein the control unit closes the door lock when the door has not been opened within the second predetermined amount of time.

6. The smart entry system according to claim 4,
   wherein the unlocking sensor and the locking sensor are capacitive sensors that detect a touching of a surface of the door handle by the user,
   wherein the unlocking sensor is disposed at a position where a touching of a surface of the door handle facing the door is able to be detected, and
   wherein the locking sensor is disposed at a position which is located on an upper side in the vehicle vertical direction of the door handle and where a touching within a movable range of a thumb of the grasping hand can be detected when the user grasps the door handle.

* * * * *